US012578951B2

(12) United States Patent
Antinori et al.

(10) Patent No.:  US 12,578,951 B2
(45) Date of Patent:      Mar. 17, 2026

(54) PREDICTIVE MODEL FOR APPLICATION UPDATE DECISIONS

(71) Applicant: Red Hat, Inc., Raleigh, NC (US)

(72) Inventors: Paolo Antinori, Milan (IT); Alessio Soldano, Milan (IT); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 228 days.

(21) Appl. No.: 18/349,037

(22) Filed: Jul. 7, 2023

(65) Prior Publication Data

US 2025/0013455 A1      Jan. 9, 2025

(51) Int. Cl.
    *G06F 9/445*        (2018.01)
    *G06F 8/65*         (2018.01)
    *G06N 5/022*        (2023.01)
(52) U.S. Cl.
    CPC .............. *G06F 8/65* (2013.01); *G06N 5/022* (2013.01)
(58) Field of Classification Search
    CPC .......... G06N 3/08; G06N 5/022; G06N 20/00; G06N 3/047; G06N 5/04; G06N 5/025; G06N 3/02; G06N 3/126; G06Q 10/0635; G06Q 10/0633; G06F 8/65; G06F 16/23; G06F 16/1858; G06F 8/71
    See application file for complete search history.

(56) References Cited

U.S. PATENT DOCUMENTS

| | | | |
|---|---|---|---|
| 11,303,517 B2 | 4/2022 | Grant et al. | |
| 11,388,727 B1 | 7/2022 | Argenti | |
| 11,436,001 B2 | 9/2022 | Masis | |
| 11,621,085 B1 * | 4/2023 | Gottula .................. | G16H 50/50 |
| | | | 706/11 |
| 2020/0057630 A1 | 2/2020 | Cho et al. | |
| 2020/0327237 A1 | 10/2020 | Shakarian et al. | |
| 2021/0157562 A1 * | 5/2021 | Sethi ........................ | G06F 9/453 |
| 2023/0267061 A1 * | 8/2023 | Degrass .................... | G06F 8/65 |
| | | | 714/1 |
| 2024/0113974 A1 * | 4/2024 | Savarese ............. | H04L 61/4511 |

* cited by examiner

*Primary Examiner* — Chuck O Kendall
(74) *Attorney, Agent, or Firm* — Womble Bond Dickinson (US) LLP

(57)            ABSTRACT

A system and method of providing one or more predictive models to enhance decision-making capabilities regarding software updates in computing network systems. The method includes receiving a request for information indicating whether to upgrade an application executing on a node. The method includes providing a historical impact profile of the node to a predictive model trained to predict possible impacts on computing resources caused by version upgrades to applications using the computing resources. The method includes predicting, based on the predictive model, a possible impact to a computing resource of the node caused by a theoretical upgrade of the application. The method includes generating a risk score indicating whether to upgrade the application executing on the node of the computing network system based on status data of the computing resource of the node and the possible impact to the computing resource of the node.

20 Claims, 6 Drawing Sheets

300

200c

300

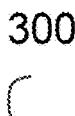

receiving a request for information indicating whether to upgrade an application executing on a node of a computing network system from a first version to a second version
302 providing a historical impact profile of the node to a predictive model trained to predict possible impacts on computing resources caused by version upgrades to applications using the computing resources
304 predicting, by a processing device based on the predictive model, a possible impact to a computing resource of the node caused by a theoretical upgrade of the application from the first version to the second version
306 generating a risk score indicating whether to upgrade the application executing on the node of the computing network from the first version to the second version based on status data of the computing resource of the node and the possible impact to the computing resource of the node
308

FIG. 3

Figure 4:
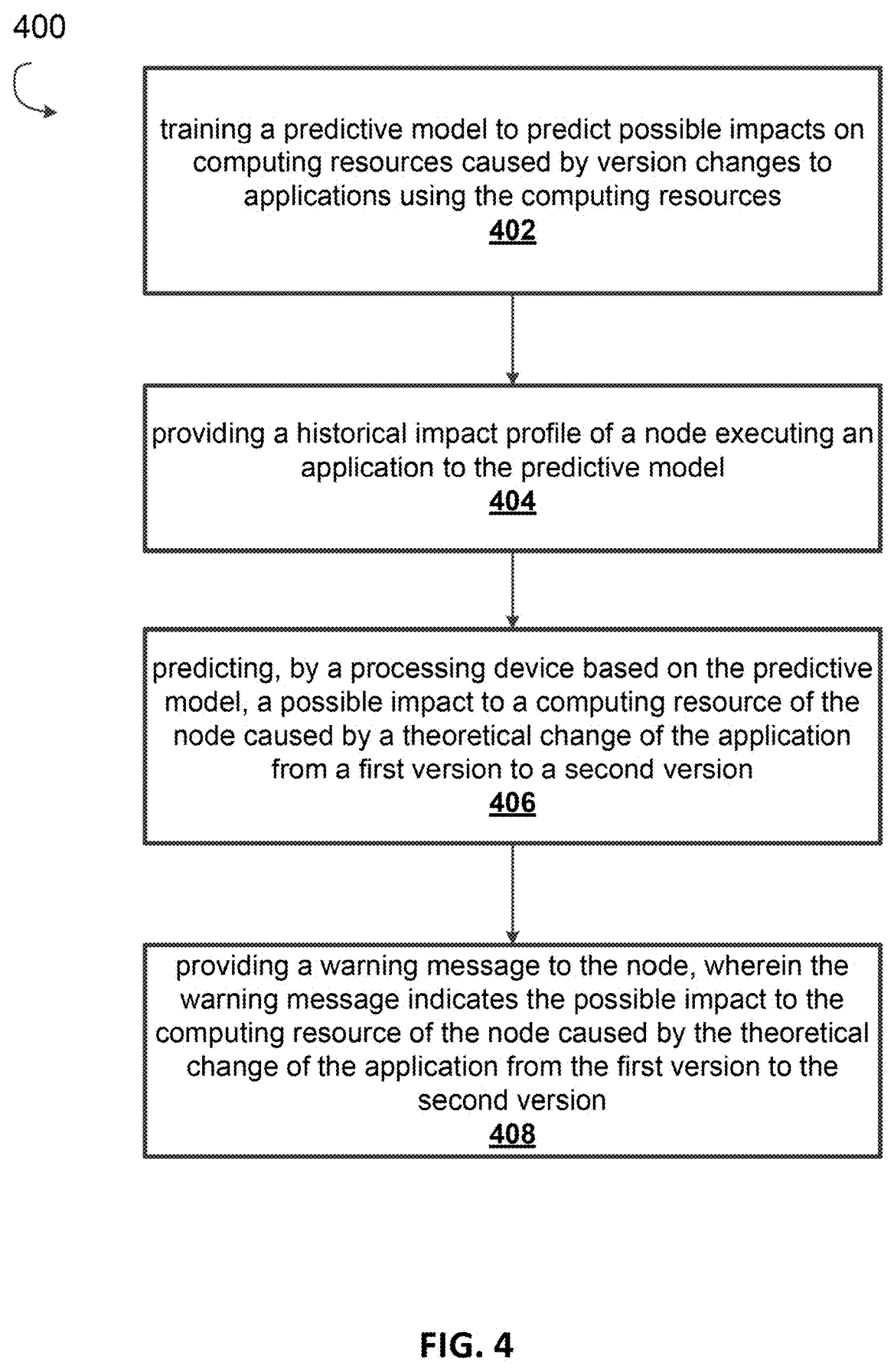

400 training a predictive model to predict possible impacts on computing resources caused by version changes to applications using the computing resources
402 providing a historical impact profile of a node executing an application to the predictive model
404 predicting, by a processing device based on the predictive model, a possible impact to a computing resource of the node caused by a theoretical change of the application from a first version to a second version
406 providing a warning message to the node, wherein the warning message indicates the possible impact to the computing resource of the node caused by the theoretical change of the application from the first version to the second version
408

PREDICTIVE MODEL FOR APPLICATION UPDATE DECISIONS

TECHNICAL FIELD

The present disclosure relates generally to software technology, and more particularly, to systems and methods of providing one or more predictive models to enhance decision-making capabilities regarding software updates in a computing network (e.g., edge network systems, mesh network systems).

BACKGROUND

The Internet of things (IoT) describes physical objects (or groups of such objects) with sensors, processing ability, software and other technologies that connect and exchange data with other devices and systems over the Internet or other communications networks. An edge device is a device that provides an entry point into enterprise or service provider core networks. A mesh network is a network in which nodes (e.g., IoT devices, edge devices) are linked together, branching off other devices or nodes. These networks are set up to efficiently route data between devices and clients. They help individuals and organizations provide a consistent connection throughout a physical space.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a flow diagram depicting a method of providing one or more predictive models to enhance decision-making capabilities regarding software updates in a computing network, according to some embodiments;

FIG. 4 is a flow diagram depicting a method of providing a warning message to nodes in a computing network regarding potential impacts of software updates on computing resources, according to some embodiments.

DETAILED DESCRIPTION

Figure 1:
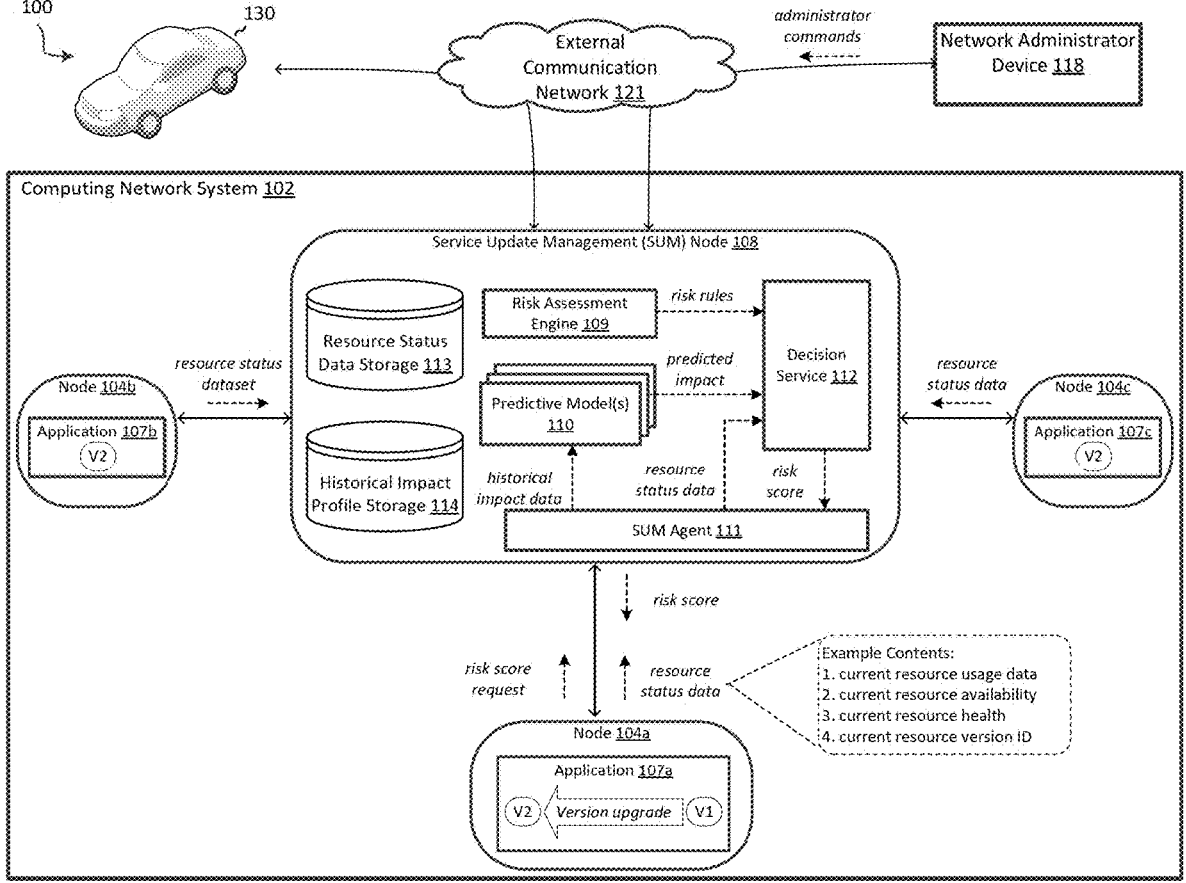
FIG. 1 is a block diagram depicting an example environment for providing one or more predictive models to enhance decision-making capabilities regarding software updates in computing network systems, according to some embodiments.

IoT devices are used for various purposes including, for example, edge computing, mesh computing, and automation scenarios (e.g., home, business, automotive). However, updating software on a low power IoT device is problematic as the cost of updating the software can be high, be it in terms of battery or CPU or storage. This poses an even bigger issue in the automotive industry, where the cost of updating software might also include recertification costs from a Functional Safety (FuSa) perspective.

Aspects of the present disclosure address the above-noted and other deficiencies by providing one or more predictive models to enhance decision-making capabilities regarding software updates in computing network systems (e.g., edge network systems, mesh network systems). As discussed in greater detail below, a service update management (SUM) node of a computing network (e.g., a mesh network system, an edge network system) of nodes is configured to track and process statistics about the impact that a version update to an application (e.g., service) executing on a particular node has on the computing resources of the node. The SUM node gathers metrics (e.g., current CPU usage, RAM usage, battery level, etc.) from the nodes of the computing network and determines the cost (e.g., CPU cost, RAM cost, drop in battery percentage, and/or cost of recertification/Continuous Integration (CI)) to perform the version update. The SUM node captures a panoramic view of the cost-to-change versions and uses it to train a predictive model, such as an autoregressive-moving average with exogenous terms (ARMAX) model. The predictive model represents a key input to a decision-based system that determines whether to process an update that is targeted at the nodes of the computing network. The SUM node evaluates the predictive model, the request, the target device, and using one or more rules that weigh the risk of staying at the current version of the application. By combining the rules and the metadata of the predictive model, the SUM node can form a simple data service that can be deployed in a vehicle (e.g., automobile, boat, plane), in an edge network, and/or a mesh network. When a device/node receives a notification of a new update available, then the node can consult the service for an informed decision as to whether the node should accept or reject the update to the application.

Benefits of the embodiments of the present disclosure include creating a more resilient computing network, by preventing application updates on nodes of the computing network that could cause stability, interoperability, and/or vulnerability issues in the computing network. The embodiments also protect the computing network (including the nodes) from constant recertification tasks, which are not only costly from a monetary and computing resource perspective (e.g., computing, memory, bandwidth, etc.), but can also shut-down the critical services (e.g., automotive service) that were designed to protect users from dangers.

In an illustrative embodiment, a service update management (SUM) node of a computing network (e.g., a mesh network system, an edge network system) of nodes receives a request for information indicating whether to upgrade an application executing on a node of an edge network system from a first version to a second version. The SUM node is configured to provide a historical impact profile of the node to a predictive model trained to predict possible impacts on computing resources caused by version upgrades to applications using the computing resources. The SUM node is configured to predict, based on the predictive model, a possible impact to a computing resource of the node caused by a theoretical upgrade of the application from the first version to the second version. The SUM node is configured to generate a risk score indicating whether to upgrade the application executing on the node of the edge network system from the first version to the second version based on status data of the computing resource of the node and the possible impact to the computing resource of the node.

FIG. 1 is a block diagram depicting an example environment for providing one or more predictive models to enhance decision-making capabilities regarding software updates in computing network systems, according to some embodiments. The environment 100 includes a computing network system 102, a network administrator device 118, and a vehicle 130 that are each coupled together through an external communication network 121. In some embodiments, the computing network system 102 may be configured to operate as an edge network system, an Internet of things (IoT) network system, and/or a mesh network system. The computing network system 102 includes a plurality of nodes 104 (e.g., nodes 104a, 104b, 104c, 104d, 104c) that are each communicatively coupled together via one or more communication networks (e.g., Bluetooth, Wi-Fi, cellular, etc.) of the computing network system 102. In some embodiments, any of the nodes 104 may be a vehicle like that of vehicle 130.

Each node 104 is configured to execute an application 107 of a particular version. Specifically, the node 104a is configured to execute an application 107a of a particular version (e.g., version 1 or V1), the node 104b is configured to execute an application 107b of a particular version (e.g., version 2 or V2), and the node 104c is configured to execute an application 107c of a particular version (e.g., version 2 or V2). One or more of the nodes 104 may execute the same version of the application 107 or different versions of the same application 107.

An application 107 may be any type of software application that provides any type of service (e.g., a network service, a computing service, a security service, etc.) for the node 104, a user of the node 104, and/or a computing device (e.g., vehicle 130) that is outside of the computing network system 102. For example, the application 107b executing on the node 104b may be an antivirus application that protects the computing resources of the node 104b from malicious activity, such as phishing attacks, viruses, malware, and ransomware. As another example, the application 107c executing on the node 104c may be a navigation application that provides navigation services (e.g., Global Positioning System (GPS) coordinates) to the vehicle 130. Different versions of the same application 107 provide different types of services. For example, a first version (e.g., V1) of application 107a may provide a low-bandwidth networking service for node 104a, but after upgrading application 107a to a second version (e.g., V2), the application 107a may provide a high-bandwidth networking service for node 104a. In some embodiments, the application 107 may be a functional safety application that provides a critical service for the node 104, a user of the node 104, and/or a computing device that is outside of the computing network system 102. A critical service may be a service that impacts a safety of a user that is associated with a node 104. For example, the application 107 may be configured to provide a service to the vehicle 130 to control the movement (e.g., acceleration, velocity, breaking, and/or steering) of the vehicle 130.

The computing network system 102 includes a service update management (SUM) node 108 (sometimes referred to as, control node), which is a node 104 that is further configured with additional administrative functionality for controlling and/or managing the other nodes 104 in the computing network system 102. The SUM node 108 is communicably coupled to one or more computing devices (e.g., network administrator device 118, vehicle 130, etc.) that are outside and not a member of the computing network system 102 via an external communication network 121. In some embodiments, the external communication network 121 may be any of the communication networks of the computing network system 102. The network administrator device 118 sets-up, trains, and/or controls the computing network system 102 by sending commands (shown in FIG. 1 as, administrator commands) to the SUM node 108, which in turn, causes the SUM node 108 to forward the commands to one or more nodes 104 of the computing network system 102.

The SUM node 108 includes a SUM agent 111, a resource status data storage 113, a historical impact profile storage 114, a risk assessment engine 109, one or more predictive models 110, and a decision service 112. In some embodiments, a predictive model 110 may be an ARMAX (e.g., p, q, b) model that includes an autoregressive (AR) part, a moving average (MA) part, and an exogenous (X) part. An ARMAX model contains the AR (p) and MA (q) models and a linear combination of the last 'b' terms of a known and external time series.

Each of the nodes 104 periodically (e.g., daily, weekly, etc.), or based on a triggering event (e.g., upon determining a change to a resource status), send their respective resource status datasets to the SUM agent 111, which in turn, stores the resource status datasets in the resource status data storage 113. A resource may be any type of computing resource of a node 104 including, for example, one or more processors (e.g., central processing units (CPUs)), a memory, a cache, a data storage (e.g., a hard drive), a network adapter, a battery, an operating system, and the like. A resource status dataset associated with a particular node 104 (e.g., node 104a) may indicate a current usage of the resource of the node 104, a current availability of the resource of the node 104, an execution time of the resource of the node 104, a current resource version identifier (ID), and/or a current health of the resource of the node 104. The current health of the resource indicates a degree in which the resource has degraded (if at all) over time. For example, a brand-new battery that provides power to an electronic device would discharge at a slower rate than an older battery that provides power to a similar electronic device.

Each of the nodes 104 periodically, or based on a triggering event (e.g., upon determining an availability of an updated historical impact profile), send their respective historical impact profiles to the SUM agent 111, which in turn, stores the historical impact profiles in the historical impact profile storage 114. A historical impact profile indicates one or more actual impacts on one or more computing resources (e.g., processors, memory, operating system, etc.) of a node 104 that were caused by (e.g., directly or indirectly) a version upgrade to an application 107 executing on the node 104. For example, a historical impact profile may indicate that a performance of a CPU of the node 104a was degraded (or in other embodiments, improved) by 10% after the application 107a was upgraded from version 1 to version 2. As another example, a historical impact profile may indicate that a discharge rate of a battery of the node 104a was degraded (or in other embodiments, improved) by 2% after the application 107a was upgraded from version 1 to version 2. The historical impact profile also indicates one or more execution times of each version of an application 107. The historical impact profile may also indicate that the application 107a was upgraded from one version (e.g., version 1) to another (e.g., version 2) at some time in the past, for example, 1 hour ago, 1 day ago, 1 week ago, etc.

In some embodiments, the SUM agent 111 may generate (e.g., calculate) the historical impact profiles instead of receiving the historical impact profiles from the nodes 104 themselves. The SUM agent may generate a historical impact profile associated with a particular node 104 (e.g., node 104*a*) by comparing a first resource status dataset of the node 104 at a first time stamp when the node 104 was executing a first version of an application 107 and a second resource status dataset of the node 104 at a second time stamp when the node 104 was executing a second version of an application 107 to determine the actual impact of upgrading the application 107 from the first version to the second version.

The SUM agent 111 uniquely trains, using a plurality of training datasets, each of the one or more predictive models 110 to predict a possible impact (either directly or indirectly) to a particular computing resource of the node 104 that could be caused by a theoretical upgrade to a version of an application 107 executing on the node 104. That is, the SUM agent 111 may train a first predictive model 110 using a first training dataset to predict a possible impact to a processing device, train a second predictive model using a second training dataset to predict a possible impact to a memory, train a third predictive model 110 using a third training dataset to predict a possible impact to a battery level, and so on.

The SUM agent 111 trains each of the predictive models 110 using a unique training dataset that is associated with a unique computing resource of a node 104. Continuing with the above examples, the first training dataset includes a plurality of historical impact profiles that are associated with a plurality of nodes 104 of the computing network system 102, where each historical impact profile indicates one or more actual impacts on one or more processing devices of a respective node 104 of the plurality of nodes 104 that was caused by a version upgrade to an application 107 executing on the respective node 104. The second training dataset includes a plurality of historical impact profiles that are associated with a plurality of nodes 104 of the computing network system 102, where each historical impact profile indicates one or more actual impacts on a memory of a respective node 104 of the plurality of nodes 104 that was caused by a version upgrade to an application 107 executing on the respective node 104. The third training dataset includes a plurality of historical impact profiles that are associated with a plurality of nodes 104 of the computing network system 102, where each historical impact profile indicates one or more actual impacts on a battery of a respective node 104 of the plurality of nodes 104 that was caused by a version upgrade to an application 107 executing on the respective node 104.

A possible impact to a computing resource of a node 104 may be an impact that the predictive model 110 predicts could possibly degrade a performance (e.g., an efficiency, a power consumption, a processing speed, a computing accuracy, a battery discharging/charging rate, etc.) of the computing resource of the node 104 or an ability for the computing resource to interoperate with other computing resources on the node 104 if the application 107 on the node 104 were upgraded from one version (e.g., V1) of the application 107 to another version (e.g., V2) of the application 107, or downgraded from one version (e.g., V2) of the application 107 to another version (e.g., V1) of the application 107. In contrast, an actual impact to a computing resource of a node 104, as indicated in a historical impact profile, is an impact that has previously occurred or is currently occurring.

A possible impact may be one that degrades a performance, interoperability, and/or a vulnerability of a computing resource of a node 104. For example, a performance (e.g., speed, accuracy, etc.) of the memory of node 104*a* might be degraded by 10% after the application 107*a* is upgraded from version 1 to version 2. The version upgrade might also degrade the interoperability between the memory and the processor by degrading the signal quality (e.g., smaller amplitude, more jitter, etc.) of the memory's data bus that is coupled to the processor. The version upgrade might also degrade a security feature of the application 107*a* to cause the computing resource to be exposed to more malicious attacks. Alternatively, a possible impact may be one that improves a performance or interoperability of a computing resource of a node 104. For example, a performance of the memory of node 104*a* might be improved by 10% after the application 107*a* is upgraded from version 1 to version 2. The version upgrade might also improve the interoperability between the memory and the processor by improving the signal quality (e.g., larger amplitude, less jitter, etc.) of the memory's data bus. The version upgrade might also improve a security feature of the application 107*a* to cause the computing resource to be exposed to less malicious attacks.

The SUM agent 111 uniquely trains each of the one or more predictive models 110 to predict a possible impact (either directly or indirectly) to a particular computing resource of a node 104, where the prediction is based on a historical impact profile of the particular node 104. For example, the node 104*a* sends a request (shown in FIG. 1 as, risk score request) to the SUM agent 111 for information indicating whether to upgrade an application 107 executing on the node 104*a* from a first version (e.g., V1) to a second version (e.g., V2. The SUM agent 111 determines, based on the request, a resource type (e.g., processor, memory, etc.) of the computing resource of the node 104*a* and selects, from among the plurality of predictive models 110, the particular predictive model 110 that is trained to predict possible impacts to that resource type that are caused by version upgrades to an application 107 that uses that resource type. The SUM agent 111 obtains the historical impact profile associated with the node 104*a* from the historical impact profile storage 114 and sends the historical impact profile to the selected predictive model 110 to cause the predictive model to generate a predicted impact based on the historical impact profile and then send the historical impact profile to the decision service 112.

The risk assessment engine 109 generates one or more rules (shown in FIG. 1 as, risk rules) that weigh the risk of staying at the current version of an application 107. A rule may weigh the risk based one or factors including, for example, a common vulnerability and exposure (CVE) factor, an interoperability risk factor from a server perspective, a cost of computing resources to execute the overall execution, and the like. The risk assessment engine 109 provides the risk rules to the decision service 112.

The decision service 112 generates, based on the risk rules, the predicted impact, and/or the resource status data associated with a particular node 104 (e.g., node 104*a*), a risk score for the particular node 104. The risk score indicates whether to upgrade the application 107 executing on the particular node 104 from a first version to the second version or downgrade the application 107 from a second version to the first version. The decision service 112 provides the risk score to the SUM agent 111, which in turn sends the risk score to the node 104*a* that originally sent the risk score request.

A communication network (e.g., external communication network 121, any of the communication networks of the computing network system 102) may be a public network (e.g., the internet), a private network (e.g., a local area network (LAN) or wide area network (WAN)), or a combination thereof. In some embodiments, a communication network may include a wired or a wireless infrastructure, which may be provided by one or more wireless communications systems, such as wireless fidelity (Wi-Fi) connectivity to the external network and/or a wireless carrier system that can be implemented using various data processing equipment, communication towers (e.g., cell towers), etc. The external network may carry communications (e.g., data, message, packets, frames, etc.) between any other the computing device.

A node 104, the SUM node 108, and a network administrator device 118 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster). The vehicle 130 may include a computing device of any type, as discussed herein.

In some embodiments, the node 104, the SUM node 108, and the network administrator device 118 may each be a wearable device (e.g., smartwatch, smart clothing, smart glasses, smart jewelry, wearable camera, wireless earbuds, fitness tracker, blood pressure monitor, heart rate monitor, etc.) or an implantable device (e.g., insulin pump, cochlear device, pacemaker, brain simulator, etc.).

Still referring to FIG. 1, the SUM node 108 receives a risk score request for information indicating whether to upgrade an application 107 executing on the node 104a from a first version to a second version. The SUM node 108 provides a historical impact profile of the node 104a to a predictive model 101 that is trained to predict possible impacts on computing resources caused by version upgrades to applications 107 using the computing resource. The SUM node 108 predicts, based on the predictive model 101, a possible impact to a computing resource of the node 104 caused by a theoretical upgrade (e.g., not an actual upgrade) of the application 107a from the first version to the second version. The SUM node 108 generates a risk score indicating whether to upgrade the application 107a from the first version to the second version based on resource status data (e.g., current usage of the resource, a current availability of the resource, an execution time of the resource, an execution time of the application 107, a current resource version identifier (ID), and/or a current health) of the computing resource of the node 104a and the possible impact to the computing resource of the node 104a.

Although FIG. 1 shows only a select number of computing devices (e.g., nodes 104, SUM node 108, network administrator device 118), the environment 100 may include any number of computing devices that are interconnected in any arrangement to facilitate the exchange of data between the computing devices. The environment may also include any number of vehicles 130.

Figure 2A:
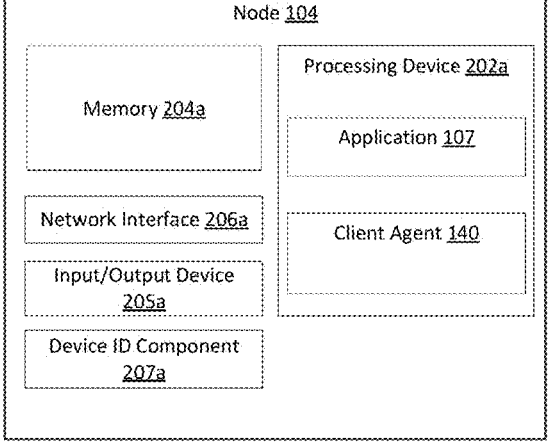
FIG. 2A is a block diagram depicting an example node of the computing network system 102 in FIG. 1, according to some embodiments.

FIG. 2A is a block diagram depicting an example node 104 of the computing network system 102 in FIG. 1, according to some embodiments. While various devices, interfaces, and logic with particular functionality are shown, it should be understood that the one or more nodes 104 (e.g., nodes 104a-c) of the computing network system 102 each include any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The node 104 includes a processing device 202a (e.g., general purpose processor, a PLD, etc.), which may be composed of one or more processors, and a memory 204a (e.g., synchronous dynamic random-access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may include one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the node 104. In some embodiments, the processing device 202a and the memory 204a form various processing devices and/or circuits described with respect to the node 104. The instructions include code from any suitable computer programming language such as, but not limited to, C, C++, C#, Java, JavaScript, VBScript, Perl, HTML, XML, Python, TCL, and Basic.

The processing device 202a executes the application 107 of a particular version. The application 107 may be any type of software application that provides any type of service (e.g., a network service, a computing service, a security service, etc.) for the node 104, a user of the node 104, and/or a computing device (e.g., vehicle 130) that is outside of the computing network system 102. Different versions of the same application 107 provide different types of services. In some embodiments, the application 107 may be a functional safety application that provides a critical service for the node 104, a user of the node 104, and/or a computing device that is outside of the computing network system 102. A critical service may be a service that impacts a safety of a user that is associated with a node 104. For example, the application 107 may be configured to provide a service to the vehicle 130 to control the movement (e.g., acceleration, velocity, breaking, and/or steering) of the vehicle 130.

The processing device 202a executes a client agent 140 that is configured to send a risk score request to the SUM node 108 for information indicating whether the client agent 140 should perform a version change to the application 107 executing on the node 104. The version change may be to upgrade the application 107 from a first version to a second version, or to downgrade the application 107 from a second version to a first version. The risk score request may include a historical impact profile associated with the node 104 and/or resource status data associated with the node 104. The client agent 140 may capture the resource status data from its computing resources (e.g., processing device 202a, memory 204a, etc.) immediately prior sending the risk score request to the SUM node 108 to ensure that the SUM node 108 receives the most-current resource status data. In response to sending the risk score request, the client agent 140 receives a risk score from the SUM node 108. In some embodiments, the risk score may be a value (e.g., 1 to 10) that indicates a risk of upgrading or downgrading a version of the application 107, where a higher value indicates a greater risk from a performance perspective, an interoperability perspective, and/or a vulnerability perspective. The client agent 140 may compare the risk score and a predetermined threshold to determine whether to upgrade/downgrade the application 107. For example, the client agent 140 may determine to cause an upgrade/downgrade of the application 107 if the risk score is below the predetermined threshold, but decide to block or prevent the upgrade/downgrade of the application 107 if the risk score is equal to or above the predetermined threshold. In some embodiments, the risk score may include a recommendation message (e.g., Yes) indicating that the client agent 140 should proceed with the upgrade/downgrade because the upgrade/downgrade is safe for the computing resource of the node 104. Alternatively, the risk score may include a recommendation message (e.g., No) indicating that the client agent 140 should not proceed with the upgrade/downgrade the application 107 because the upgrade/downgrade will likely harm the computing resource of the node 104. The client agent 140 implements SUM node's 108 recommendation as indicated in the risk score.

The node 104 includes a network interface 206a configured to establish a communication session with a computing device for sending and receiving data over a communication network to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the node 104 includes a plurality of network interfaces 206a of different types, allowing for connections to a variety of networks, such as local area networks (public or private) or wide area networks including the Internet, via different sub-networks.

The node 104 includes an input/output device 205a configured to receive user input from and provide information to a user. In this regard, the input/output device 205a is structured to exchange data, communications, instructions, etc. with an input/output component of the node 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the node 104, such as a built-in display, touch screen, microphone, etc., or external to the housing of the node 104, such as a monitor connected to the node 104, a speaker connected to the node 104, etc., according to various embodiments. In some embodiments, the node 104 includes communication circuitry for facilitating the exchange of data, values, messages, and the like between the input/output device 205a and the components of the node 104. In some embodiments, the input/output device 205a includes machine-readable media for facilitating the exchange of information between the input/output device 205a and the components of the node 104. In still another embodiment, the input/output device 205a includes any combination of hardware components (e.g., a touchscreen), communication circuitry, and machine-readable media.

The node 104 includes a device identification component 207a (shown in FIG. 2A as device ID component 207a) configured to generate and/or manage a device identifier (sometimes referred to as, "node ID") associated with the node 104. The device identifier may include any type and form of identification used to distinguish the node 104 from other computing devices. In some embodiments, to preserve privacy, the device identifier may be cryptographically generated, encrypted, or otherwise obfuscated by any device and/or component of node 104. In some embodiments, the node 104 may include the device identifier in any communication (e.g., public encrypted message, private encrypted message, etc.) that the node 104 sends to a computing device.

The node 104 includes a bus (not shown), such as an address/data bus or other communication mechanism for communicating information, which interconnects the devices and/or components of node 104, such as processing device 202a, network interface 206a, input/output device 205a, and/or device ID component 207a.

In some embodiments, some or all the devices and/or components of node 104 may be implemented with the processing device 202a. For example, the node 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

Figure 2B:
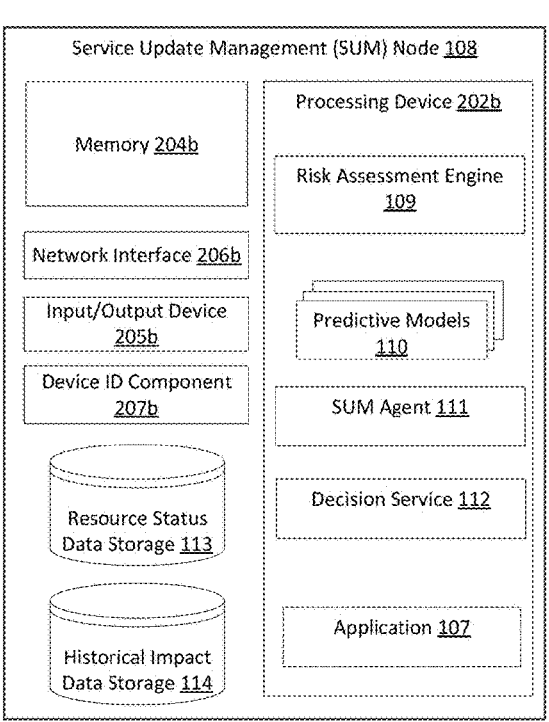
FIG. 2B is a block diagram depicting an example of the service update management (SUM) node of the environment in FIG. 1, according to some embodiments.

FIG. 2B is a block diagram depicting an example of the service update management (SUM) node 108 of the environment in FIG. 1, according to some embodiments. While various devices, interfaces, and logic with particular functionality are shown, it should be understood that the SUM node 108 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The SUM node includes the resource status data storage 113 and the historical impact profile storage 114.

The SUM node 108 includes a processing device 202b (e.g., general purpose processor, a PLD, etc.), which may be composed of one or more processors, and a memory 204b (e.g., synchronous dynamic random-access memory (DRAM), read-only memory (ROM)), which may communicate with each other via a bus (not shown). The processing device 202b includes identical or nearly identical functionality as processing device 202a in FIG. 2a, but with respect to devices and/or components of the SUM node 108 instead of devices and/or components of the node 104.

The memory 204*b* of processing device 202*b* stores data and/or computer instructions/code for facilitating at least some of the various processes described herein. The memory 204*b* includes identical or nearly identical functionality as memory 204*a* in FIG. 2A, but with respect to devices and/or components of the SUM node 108 instead of devices and/or components of the node 104.

The processing device 202*a* of the SUM node 108 may execute an application 107 of a particular version. The application 107 may be configured to provide a service directly to the SUM node 108 instead of the other nodes in the computing network system. For example, the SUM node 108 may be included in or mounted onto a vehicle, where the application 107 executing on the SUM node 108 controls the movement (e.g., acceleration, velocity, breaking, and/or steering) of the vehicle or provides navigational directions for the vehicle.

The processing device 202*b* executes a SUM agent 111, a risk assessment engine 109, one or more predictive models 110, and a decision service 112. The SUM agent 111 may be configured to receive a request (e.g., risk score request) for information indicating whether to upgrade an application 107 executing on a node 104 of from a first version to a second version. The SUM agent 111 may be configured to provide a historical impact profile of the node 104 to a predictive model 110 trained to predict possible impacts on computing resources caused by version upgrades to applications 107 using the computing resources. The predictive model 110 may predict, based on the historical impact profile, a possible impact to a computing resource of the node 104 caused by a theoretical upgrade of the application 107 from the first version to the second version. The predictive model 110 provides the possible impact to the decision service 112. The decision service 112 may be configured to generate a risk score indicating whether to upgrade the application 107 executing on the node 104 from the first version to the second version based on resource status data of the computing resource of the node 104, the possible impact to the computing resource of the node 104, and/or one or more risk rules.

The SUM agent 111 may be configured to obtain a plurality of historical impact profiles associated with a plurality of nodes 104. Each historical impact profile of the plurality of historical impact profiles indicates one or more actual impacts on one or more computing resources of a respective node 104 of the plurality of nodes 104 caused by one or more version upgrades to applications 107 executing on the respective node 104.

The SUM agent 111 may be configured to generate a plurality of training datasets based on the plurality of historical impact profiles for a plurality of predictive models 110 associated with a plurality of computing resources. The SUM agent 111 may be configured to uniquely train, for each of the plurality of predictive models 110, a respective predictive model 110 to predict possible impacts on a respective computing resource of the plurality of computing resources caused by theoretical version upgrades to a particular application 107 using the respective computing resource.

The SUM agent 111 may be configured to determine, based on the request, a resource type of the computing resource of the node 104. The SUM agent 111 may be configured to select, from the plurality of predictive models 110, the predictive model 110 based on the resource type of the computing resource. In some embodiments, the resource status data includes at least one of a current usage of the computing resource of the node 104, a current availability of the node 104, or a current health of the computing resource.

The decision service 112 may be configured to generate the risk score indicating whether to upgrade the application 107 executing on the node 104 from the first version to the second version based on a plurality of rules (e.g., risk rules), one or more possible impacts (e.g., from the predictive model 110), and/or resource status data associated with a particular node 104. The decision service 112 may be configured to provide the risk score to the SUM agent 111, which in turn, forwards the risk score to the node 104 to cause the node 104 to accept or reject the upgrade to the application 107 based on the risk score.

A first rule may weigh a risk of changing a current version of the application 107 executing on the node 104 from a common vulnerability and exposure (CVE) perspective. A second rule may weigh the risk of changing the version of the application 107 executing on the node 104 from an interoperability perspective.

The predictive model 110 may be configured to predict the possible impact to the computing resource of the node 104 by evaluating, using an autoregressive function of the predictive model 110, one or more actual impacts on the computing resource of the node 104 caused by one or more executions of previous versions of the application 107. The predictive model 110 may be configured to predict the possible impact to the computing resource of the node 104 by evaluating, using a moving average function of the predictive model 110, a variance in the possible impact caused by a non-deterministic environment of the node 104. The predictive model 110 may be configured to predict the possible impact to the computing resource of the node 104 by evaluating, using an exogenous terms function of the predictive model, differences between the first version and the second version of the application 107.

As discussed above, the processing device 202*b* of the SUM node 108 may also execute an application 107 of a particular version. In this embodiment, the SUM agent 111 may be configured to determine that a version upgrade is available for the application 107 that is executing on the SUM node 108, and in response, may determine whether to upgrade the application 107 executing on the SUM node 108. In this embodiment, the decision service 112 may be configured to provide the risk score to the SUM agent 111, which in turn, may determine whether to accept or reject the upgrade to the application 107 based on the risk score. The SUM agent 111 may grant permission to a node 104 (or any component of the SUM node 108) to perform the upgrade or, the SUM agent 111 may perform the upgrade itself.

The SUM node 108 includes a network interface 206*b* configured to establish a communication session with a computing device for sending and receiving data over a network to the computing device. Accordingly, the network interface 206*b* includes identical or nearly identical functionality as network interface 206*a* in FIG. 2A, but with respect to devices and/or components of the SUM node 108 instead of devices and/or components of the node 104.

The SUM node 108 includes an input/output device 205*b* configured to receive user input from and provide information to a user. In this regard, the input/output device 205*b* is structured to exchange data, communications, instructions, etc. with an input/output component of the SUM node 108. The input/output device 205*b* includes identical or nearly identical functionality as input/output device 205*a* in FIG.

2A, but with respect to devices and/or components of the SUM node 108 instead of devices and/or components of the node 104.

The SUM node 108 includes a device identification component 207b (shown in FIG. 2B as device ID component 207b) configured to generate and/or manage a device identifier associated with the SUM node 108. The device ID component 207b includes identical or nearly identical functionality as device ID component 207a in FIG. 2A, but with respect to devices and/or components of the SUM node 108 instead of devices and/or components of the node 104.

The SUM node 108 includes a bus (not shown), such as an address/data bus or other communication mechanism for communicating information, which interconnects the devices and/or components of the SUM node 108, such as processing device 202b, network interface 206b, input/output device 205b, and/or device ID component 207b.

In some embodiments, some or all the devices and/or components of SUM node 108 may be implemented with the processing device 202b. For example, the SUM node 108 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

Additional Details about ARMAX Models

As discussed above, a predictive model 110 may be an autoregressive-moving average model (ARMAX). The idea behind this type of predictive model to build a service(S) that tracks and processes statistics about the process of a service component release/version update of a node 104. Assuming the version update is triggered for each approved release of the component project, the service may record the execution time, the CPU usage, the battery drop, the RAM usage, and/or and the outcome of a function (ACF) defining the additional complexity introduced by the current release.

The definition of ACF may be up to subject matter experts configuring S. As an example, it could consider the number of new lines of code/classes that are added and removed, the size of update library, the number of tests added or removed, or the like.

With the collected data, the service may be configured to model the process of executing the update using one (or multiple, if willing to account for sensibly different execution hardware resources) ARMAX model.

In some embodiments, predictive model 110 that is configured as an ARMAX (m, n, k+p) model may perform according to the following equation:

$$v(t) =$$

$$a1 \cdot v(t-1) + a2 \cdot v(t-2) + \ldots + am \cdot v(t-m) + c0 \cdot e(t) + c1 \cdot e(t-1) +$$

$$\ldots + cn \cdot e(t-n) + b0 \cdot u(t-k) + b1 \cdot u(t-k-1) + \ldots + bp \cdot u(t-k-p)$$

The variable 't' indicates the update in the current development branch release history (e.g., t=1 is the first release of the component project, t=2 is the second one, etc.).

The variable v(t) is the cost function (e.g., update execution time, battery drop, memory consumption, CPU consumption). The variables a1 . . . am are constant parameters to weight the contribution of the previous execution times, battery drop, memory consumption, CPU consumption The variable e(t) is a noise function accounting for the different time (e.g., battery drop, memory consumption, CPU consumption) for executing the exact same update (e.g., same release version) multiple times on same or similar hardware (e.g., due to not fully deterministic aspects related to the device hardware, etc.) The variables c0 . . . cn are constant parameters to weight the contribution of the noise. The variable u(t) is the exogenous contribution function, e.g., ACF(t). The variables b0 . . . bp are constant parameters to weight the contribution of the additional complexity in a given commit. In some embodiments, k+p may be 0.

In other words, a predictive model 110 that is configured as an ARMAX model may include an autoregressive (AR) part that considers a cost of one or more previous executions, a moving average (MA) part that considers the variance introduced due to the version upgrade executing on a complex and random environment, and/or an exogenous (X) part that considers additional complexity associated with differences between two versions of the same application 107.

The SUM node 108 may properly set up the service of the predictive model 110 to use an initial data set (e.g., the first j commits) for model fitting, including computing constant parameters. The SUM node 108 may then decide on a suitable value for n for a given set of hardware. With that, during the boot phase of the service for a given project component, the estimation of the constant parameters would likely be done through least square regression analysis comparing the candidate model with the data of the first j releases. Once the model is properly defined, the service allows estimating the cost of performing a new update, knowing the cost of the previous ones and the outcome of the function that evaluates the complexity added with the new update.

Figure 2C:
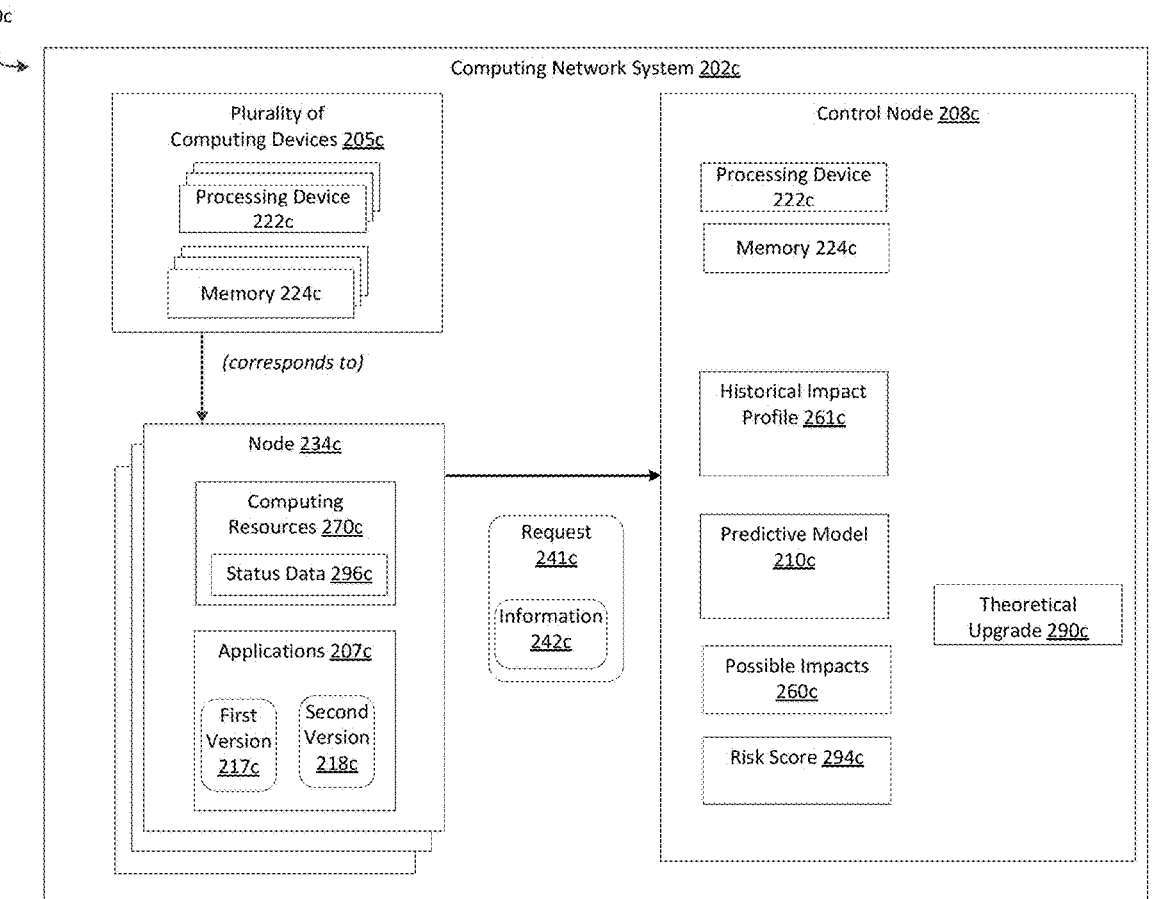
FIG. 2C is a block diagram depicting an example environment of a computing network system, according to some embodiments.

FIG. 2C is a block diagram depicting an example environment of a computing network system, according to some embodiments. A computing network system 202c (e.g., computing network system 102 in FIG. 1) may include a plurality of computing devices 205c, wherein each computing device 205c corresponds to a respective node of a plurality of nodes 234c of the computing network system 202c, each computing device 205c includes a memory 224c and a processing device 222c operatively coupled to the memory 224c.

The processing device 223c of a control node 208c (e.g., SUM node 108 in FIG. 1) of the plurality of nodes 234c may receive a request 241c for information 242c indicating whether to upgrade an application 207c executing on a node 234c of the computing network system 202c from a first version 217c to a second version 218c. The processing device 222c of the control node 208c may provide a historical impact profile 261c of the node 234c to a predictive model 210c trained to predict possible impacts 260c on computing resources 270c caused by version upgrades to applications 207c using the computing resources 270c. The processing device 222c of the control node 208c may predict, based on the predictive model 210c, a possible impact 260c to a computing resource 270c of the node 234c caused by a theoretical upgrade 290c of the application 207c from the first version 217c to the second version 218c. The processing device 222c of the control node 208c may generate a risk score 294c indicating whether to upgrade the application 207c executing on the node 234c of the computing network system 202c from the first version 217c to the second version 218c based on status data 296c of the computing resource 270c of the node 234c and the possible impact 260c to the computing resource 270c of the node 234c.

FIG. 3 is a flow diagram depicting a method of providing one or more predictive models to enhance decision-making capabilities regarding software updates in a computing network, according to some embodiments. Method 300 may be performed by processing logic that may include hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 300 may be performed by a SUM node, such as SUM node 108 in FIG. 1. In some embodiments, method 300 may be performed by one or more nodes, such as nodes 104 in FIG. 1. In some embodiments, method 300 may be performed by a computing network system, such as computing network system 102 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of receiving a request for information indicating whether to upgrade an application executing on a node of a computing network system from a first version to a second version. The method 300 includes the block 304 of providing a historical impact profile of the node to a predictive model trained to predict possible impacts on computing resources caused by version upgrades to applications using the computing resources. The method 300 includes the block 306 of predicting, by a processing device based on the predictive model, a possible impact to a computing resource of the node caused by a theoretical upgrade of the application from the first version to the second version. The method of 300 includes the block 308 of generating a risk score indicating whether to upgrade the application executing on the node of the computing network from the first version to the second version based on status data of the computing resource of the node and the possible impact to the computing resource of the node.

FIG. 4 is a flow diagram depicting a method of providing a warning message to nodes in a computing network regarding potential impacts of software updates on computing resources, according to some embodiments. Method 400 may be performed by processing logic that may include hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 400 may be performed by a SUM node, such as SUM node 108 in FIG. 1. In some embodiments, method 400 may be performed by one or more nodes, such as nodes 104 in FIG. 1. In some embodiments, method 400 may be performed by a computing network system, such as computing network system 102 in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of training a predictive model to predict possible impacts on computing resources caused by version changes to applications using the computing resources. The method 400 includes the block 404 of providing a historical impact profile of a node executing an application to the predictive model. The method 400 includes the block 406 of predicting, by a processing device based on the predictive model, a possible impact to a computing resource of the node caused by a theoretical change (e.g., upgrade, downgrade, modifications, swapping the application with a different application, etc.) of the application from a first version to a second version. The method of 400 includes the block 408 of providing a warning message to the node, wherein the warning message indicates the possible impact to the computing resource of the node caused by the theoretical change of the application from the first version to the second version.

Figure 5:
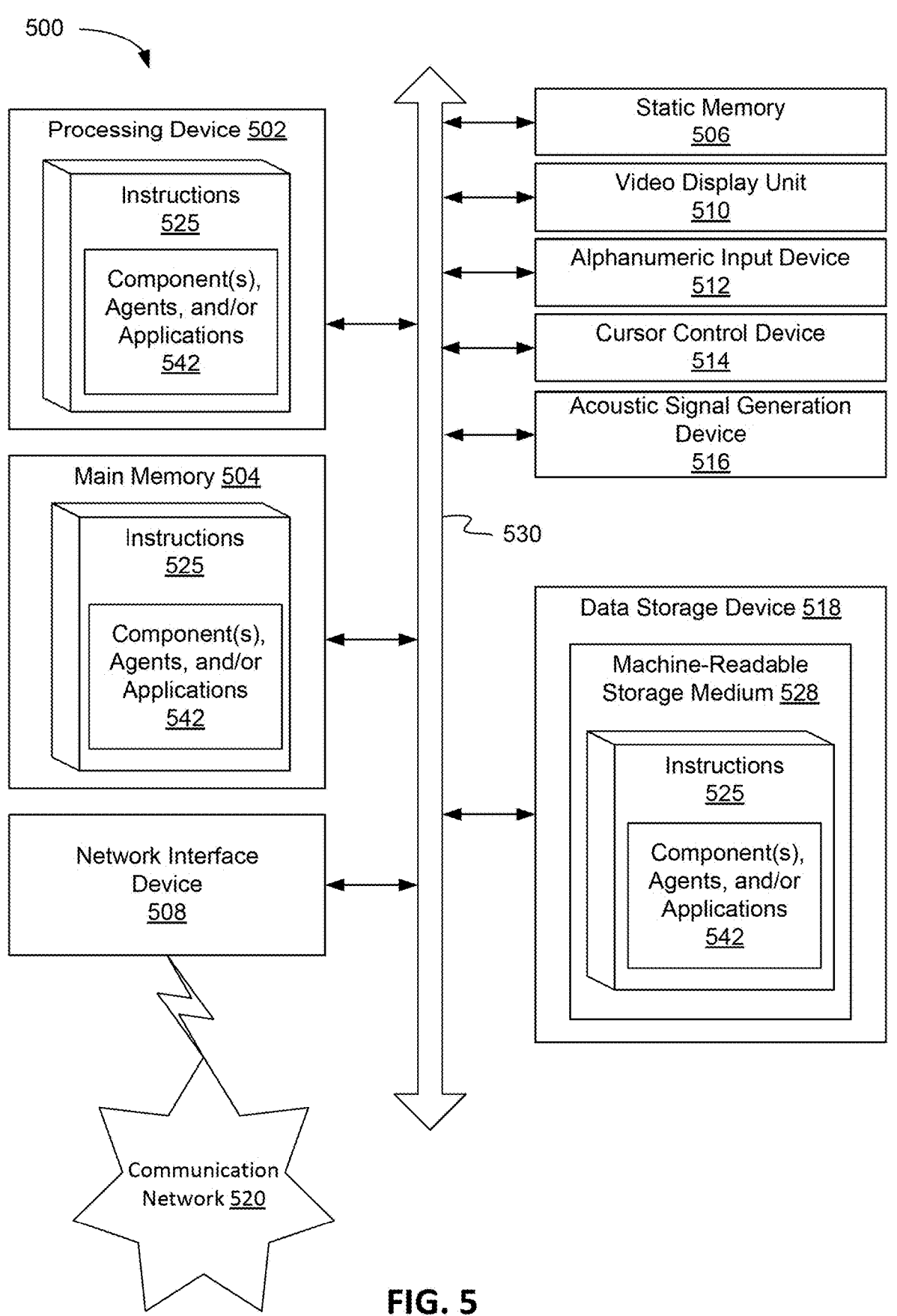
FIG. 5 is a block diagram of an example computing device that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general-purpose processor, a PLD, etc.) 502, a main memory 504 (e.g., synchronous dynamic random-access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components, agents, and/or applications 542 (e.g., SUM agent 111, risk assessment engine 109, predictive models 110, decision service 112 in FIG. 1) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method including receiving a request for information indicating whether to upgrade an application executing on a node of a computing network system from a first version to a second version; providing a historical impact profile of the node to a predictive model trained to predict possible impacts on computing resources caused by version upgrades to applications using the computing resources; predicting, by a processing device based on the predictive model, a possible impact to a computing resource of the node caused by a theoretical upgrade of the application from the first version to the second version; and generating a risk score indicating whether to upgrade the application executing on the node of the computing network from the first version to the second version based on status data of the computing resource of the node and the possible impact to the computing resource of the node.

Example 2 is the method of Example 1, further including obtaining a plurality of historical impact profiles associated with a plurality of nodes of the computing network system, each historical impact profile of the plurality of historical impact profiles indicates one or more actual impacts on one or more computing resources of a single node of the plurality of nodes caused by one or more version upgrades to applications executing on the single node.

Example 3 is the method of any of Examples 1-2, further including generating a plurality of training datasets based on the plurality of historical impact profiles for a plurality of predictive models associated with a plurality of computing resources; and uniquely training, for each of the plurality of predictive models, a respective predictive model to predict possible impacts on a respective computing resource of the plurality of computing resources caused by theoretical version upgrades to a particular application using the respective computing resource.

Example 4 is the method of any of Examples 1-3, further including determining, based on the request, a resource type of the computing resource of the node; and selecting, from the plurality of predictive models, the predictive model based on the resource type of the computing resource.

Example 5 is the method of any of Examples 1-4, wherein the status data includes at least one of a current usage of the computing resource of the node, a current availability of the node, or a current health of the computing resource.

Example 6 is the method of any of Examples 1-5, wherein generating the risk score indicating whether to upgrade the application executing on the node of the computing network system from the first version to the second version is further based on a plurality of rules, wherein a first rule evaluates a first risk of changing a current version of the application executing on the node from a common vulnerability and exposure (CVE) perspective, wherein a second rule evaluates a second risk of changing the version of the application executing on the node from an interoperability perspective.

Example 7 is the method of any of Examples 1-6, wherein predicting, by the processing device based on the predictive model, the possible impact to the computing resource of the node further includes evaluating, using an autoregressive function of the predictive model, one or more actual impacts on the computing resource of the node caused by one or more executions of previous versions of the application.

Example 8 is the method of any of Examples 1-7, wherein predicting, by the processing device based on the predictive model, the possible impact to the computing resource of the node further includes evaluating, using a moving average function of the predictive model, a variance in the possible impact caused by a non-deterministic environment of the node.

Example 9 is the method of any of Examples 1-8, wherein predicting, by the processing device based on the predictive model, the possible impact to the computing resource of the node further includes evaluating, using an exogenous terms function of the predictive model, differences between the first version and the second version of the application.

Example 10 is the method of any of Examples 1-9, further including providing the risk score to the node of the computing network system to cause the node to accept or reject the upgrade to the application based on the risk score.

Example 11 is a computing network system including a plurality of computing devices, wherein each computing device corresponds to a respective node of a plurality of nodes of the computing network system, each computing device includes a memory and a processing device operatively coupled to the memory, wherein the processing device of a control node of the plurality of nodes to receive a request for information indicating whether to upgrade an application executing on a node of the computing network system from a first version to a second version; provide a historical impact profile of the node to a predictive model trained to predict possible impacts on computing resources caused by version upgrades to applications using the computing resources; predict, based on the predictive model, a possible impact to a computing resource of the node caused by a theoretical upgrade of the application from the first version to the second version; and generate a risk score indicating whether to upgrade the application executing on the node of the computing network system from the first version to the second version based on status data of the computing resource of the node and the possible impact to the computing resource of the node.

Example 12 is the computing network system of Example 11, the processing device of the control node is further to obtain a plurality of historical impact profiles associated with a plurality of nodes of the computing network system, each historical impact profile plurality of historical impact profiles indicates one or more actual impacts on one or more computing resources of a single node of the plurality of nodes caused by one or more version upgrades to applications executing on the single node.

Example 13 is the computing network system of any of Examples 11-12, the processing device of the control node is further to generate a plurality of training datasets based on the plurality of historical impact profiles for a plurality of predictive models associated with a plurality of computing resources; and uniquely train, for each of the plurality of predictive models, a respective predictive model to predict possible impacts on a respective computing resource of the plurality of computing resources caused by theoretical version upgrades to a particular application using the respective computing resource.

Example 14 is the computing network system of any of Examples 11-13, the processing device of the control node is further to determine, based on the request, a resource type of the computing resource of the node; and select, from the plurality of predictive models, the predictive model based on the resource type of the computing resource.

Example 15 is the computing network system of any of Examples 11-14, wherein the status data includes at least one of a current usage of the computing resource of the node, a current availability of the node, or a current health of the computing resource.

Example 16 is the computing network system of any of Examples 11-15, wherein to generate the risk score indicating whether to upgrade the application executing on the node of the computing network system from the first version to the second version is further based on a plurality of rules, wherein a first rule evaluates a first risk of changing a current version of the application executing on the node from a common vulnerability and exposure (CVE) perspective, wherein a second rule evaluates a second risk of changing the version of the application executing on the node from an interoperability perspective.

Example 17 is the computing network system of any of Examples 11-16, wherein to predict, based on the predictive model, the possible impact to the computing resource of the node, the processing device of the control node is further to evaluate, using an autoregressive function of the predictive model, one or more actual impacts on the computing resource of the node caused by one or more executions of previous versions of the application.

Example 18 is the computing network system of any of Examples 11-17, wherein to predict, based on the predictive model, the possible impact to the computing resource of the node, the processing device of the control node is further to at least one of evaluate, using a moving average function of the predictive model, a variance in the possible impact caused by a non-deterministic environment of the node, or evaluate, using an exogenous terms function of the predictive model, differences between the first version and the second version of the application.

Example 19 is the computing network system of any of Examples 11-18, wherein the processing device of the control node is further to provide the risk score to the node of the computing network system to cause the node to accept or reject the upgrade to the application based on the risk score.

Example 20 is a non-transitory computer-readable medium storing instructions that, when execute by a processing device of a control node of a computing network system, cause the processing device to receive a request for information indicating whether to upgrade an application executing on a node of the computing network system from a first version to a second version; provide a historical impact profile of the node to a predictive model trained to predict possible impacts on computing resources caused by version upgrades to applications using the computing resources; predict, by the processing device based on the predictive model, a possible impact to a computing resource of the node caused by a theoretical upgrade of the application from the first version to the second version; and generate a risk score indicating whether to upgrade the application executing on the node of the computing network system from the first version to the second version based on status data of the computing resource of the node and the possible impact to the computing resource of the node.

Example 21 is a method including training a predictive model to predict possible impacts on computing resources caused by version changes to applications using the computing resources; providing a historical impact profile of a node executing an application to the predictive model; predicting, by a processing device based on the predictive model, a possible impact to a computing resource of the node caused by a theoretical change of the application from a first version to a second version; and providing a warning message to the node, wherein the warning message indicates the possible impact to the computing resource of the node caused by the theoretical change of the application from the first version to the second version.

Example 22 is the method of Example 21, further including calculating a risk score indicating whether to change the application executing on the node of the computing network from the first version to the second version based on at least one of status data of the computing resource of the node or the possible impact to the computing resource of the node; and obtaining a plurality of historical impact profiles associated with a plurality of nodes of the computing network system, each historical impact profile of the plurality of historical impact profiles indicates one or more actual impacts on one or more computing resources of a single node of the plurality of nodes caused by one or more version changes to applications executing on the single node.

Example 23 is the method of any of Examples 21-22, further including generating a plurality of training datasets based on the plurality of historical impact profiles for a plurality of predictive models associated with a plurality of computing resources; and uniquely training, for each of the plurality of predictive models, a respective predictive model to predict possible impacts on a respective computing resource of the plurality of computing resources caused by theoretical version changes to a particular application using the respective computing resource.

Example 24 is the method of any of Examples 21-23, further including determining, based on the request, a resource type of the computing resource of the node; and selecting, from the plurality of predictive models, the predictive model based on the resource type of the computing resource.

Example 25 is the method of any of Examples 21-24, wherein the status data includes at least one of a current usage of the computing resource of the node, a current availability of the node, or a current health of the computing resource.

Example 26 is the method of any of Examples 21-25, wherein generating the risk score indicating whether to change the application executing on the node of the computing network system from the first version to the second version is further based on a plurality of rules, wherein a first rule evaluates a first risk of changing a current version of the application executing on the node from a common vulnerability and exposure (CVE) perspective, wherein a second rule evaluates a second risk of changing the version of the application executing on the node from an interoperability perspective.

Example 27 is the method of any of Examples 21-26, wherein predicting, by the processing device based on the predictive model, the possible impact to the computing resource of the node further includes evaluating, using an autoregressive function of the predictive model, one or more actual impacts on the computing resource of the node caused by one or more executions of previous versions of the application.

Example 28 is the method of any of Examples 21-27, wherein predicting, by the processing device based on the predictive model, the possible impact to the computing resource of the node further includes evaluating, using a moving average function of the predictive model, a variance in the possible impact caused by a non-deterministic environment of the node.

Example 29 is the method of any of Examples 21-28, wherein predicting, by the processing device based on the predictive model, the possible impact to the computing resource of the node further includes evaluating, using an exogenous terms function of the predictive model, differences between the first version and the second version of the application.

Example 30 is the method of any of Examples 21-29, further including providing the risk score to the node of the computing network system to cause the node to accept or reject the change to the application based on the risk score.

Example 31 is an apparatus including means for receiving a request for information indicating whether to upgrade an application executing on a node of a computing network system from a first version to a second version; means for providing a historical impact profile of the node to a predictive model trained to predict possible impacts on computing resources caused by version upgrades to applications using the computing resources; means for predicting, by a processing device based on the predictive model, a possible impact to a computing resource of the node caused by a theoretical upgrade of the application from the first version to the second version; and means for generating a risk score indicating whether to upgrade the application executing on the node of the computing network from the first version to the second version based on status data of the computing resource of the node and the possible impact to the computing resource of the node.

Example 32 is the apparatus of Example 31, further including means for obtaining a plurality of historical impact profiles associated with a plurality of nodes of the computing network system, each historical impact profile of the plurality of historical impact profiles indicates one or more actual impacts on one or more computing resources of a single node of the plurality of nodes caused by one or more version upgrades to applications executing on the single node.

Example 33 is the apparatus of any of Examples 31-32, further including means for generating a plurality of training datasets based on the plurality of historical impact profiles for a plurality of predictive models associated with a plurality of computing resources; and means for training, for each of the plurality of predictive models, a respective predictive model to predict possible impacts on a respective computing resource of the plurality of computing resources caused by theoretical version upgrades to a particular application using the respective computing resource.

Example 34 is the apparatus of any of Examples 31-33, further including means for determining, based on the request, a resource type of the computing resource of the node; and selecting, from the plurality of predictive models, the predictive model based on the resource type of the computing resource.

Example 35 is the apparatus of any of Examples 31-34, wherein the status data includes at least one of a current usage of the computing resource of the node, a current availability of the node, or a current health of the computing resource.

Example 36 is the apparatus of any of Examples 31-35, wherein means for generating the risk score indicating whether to upgrade the application executing on the node of the computing network system from the first version to the second version is further based on a plurality of rules, wherein a first rule weighs a risk of changing a current version of the application executing on the node from a common vulnerability and exposure (CVE) perspective, wherein a second rule weighs the risk of changing the version of the application executing on the node from an interoperability perspective.

Example 37 is the apparatus of any of Examples 31-36, wherein means for predicting, by the processing device based on the predictive model, the possible impact to the computing resource of the node further includes means for evaluating, using an autoregressive function of the predictive model, one or more actual impacts on the computing resource of the node caused by one or more executions of previous versions of the application.

Example 38 is the apparatus of any of Examples 31-37, wherein means for predicting, by the processing device based on the predictive model, the possible impact to the computing resource of the node further includes means for evaluating, using a moving average function of the predictive model, a variance in the possible impact caused by a non-deterministic environment of the node.

Example 39 is the apparatus of any of Examples 31-38, wherein means for predicting, by the processing device based on the predictive model, the possible impact to the computing resource of the node further includes means for evaluating, using an exogenous terms function of the predictive model, differences between the first version and the second version of the application.

Example 40 is the apparatus of any of Examples 31-39, further means for including providing the risk score to the node of the computing network system to cause the node to accept or reject the upgrade to the application based on the risk score.

Unless specifically stated otherwise, terms such as "receiving," "providing," "predicting," "generating," "selecting," "obtaining," "training," "evaluating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112 (f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method, comprising:

receiving a request for information indicating whether to upgrade an application executing on a node of a computing network system from a first version to a second version;

providing a historical impact profile of the node to a predictive model trained to predict possible impacts on computing resources caused by version upgrades to applications using the computing resources;

predicting, by a processing device based on the predictive model, a possible impact to a computing resource of the node caused by a theoretical upgrade of the application from the first version to the second version; and generating a risk score indicating whether to upgrade the application executing on the node of the computing network system from the first version to the second version based on status data of the computing resource of the node and the possible impact to the computing resource of the node, wherein the status data comprises a current health of the computing resource indicating a degree in which the computing resource has degraded over time, and further based on a recertification burden associated with performing the upgrade, the recertification burden comprising at least one of a functional safety validation effort or a continuous integration process impact.

2. The method of claim 1, further comprising:

obtaining a plurality of historical impact profiles associated with a plurality of nodes of the computing network system, each historical impact profile of the plurality of historical impact profiles indicates one or more actual impacts on one or more computing resources of a single node of the plurality of nodes caused by one or more version upgrades to applications executing on the single node.

3. The method of claim 2, further comprising:

generating a plurality of training datasets based on the plurality of historical impact profiles for a plurality of predictive models associated with a plurality of computing resources; and training, for each of the plurality of predictive models, a respective predictive model to predict possible impacts on a respective computing resource of the plurality of computing resources caused by theoretical version upgrades to the application using the respective computing resource.

4. The method of claim 3, further comprising:

determining, based on the request, a resource type of the computing resource of the node; and selecting, from the plurality of predictive models, the predictive model based on the resource type of the computing resource.

5. The method of claim 1, wherein the status data comprises at least one of a current usage of the computing resource of the node or a current availability of the node.

6. The method of claim 1, wherein generating the risk score indicating whether to upgrade the application executing on the node of the computing network system from the first version to the second version is further based on a plurality of rules, wherein a first rule of the plurality of rules evaluates a first risk of changing the first version of the application executing on the node from a common vulnerability and exposure (CVE) perspective, wherein a second rule of the plurality of rules evaluates a second risk of changing the first version of the application executing on the node from an interoperability perspective.

7. The method of claim 1, wherein predicting, by the processing device based on the predictive model, the possible impact to the computing resource of the node further comprises:

evaluating, using an autoregressive function of the predictive model, one or more actual impacts on the computing resource of the node caused by one or more executions of previous versions of the application.

8. The method of claim 1, wherein predicting, by the processing device based on the predictive model, the possible impact to the computing resource of the node further comprises:

evaluating, using a moving average function of the predictive model, a variance in the possible impact caused by a non-deterministic environment of the node.

9. The method of claim 1, wherein predicting, by the processing device based on the predictive model, the possible impact to the computing resource of the node further comprises:

evaluating, using an exogenous terms function of the predictive model, differences between the first version and the second version of the application.

10. The method of claim 1, further comprising:

providing the risk score to the node of the computing network system to cause the node to accept or reject the upgrade to the application based on the risk score.

11. A computing network system, comprising:

a plurality of computing devices, wherein each computing device corresponds to a respective node of a plurality of nodes of the computing network system, each computing device comprises a memory and a processing device operatively coupled to the memory, wherein the processing device of a control node of the plurality of nodes to:

receive a request for information indicating whether to upgrade an application executing on a node of the computing network system from a first version to a second version;

provide a historical impact profile of the node to a predictive model trained to predict possible impacts on computing resources caused by version upgrades to applications using the computing resources;

predict, based on the predictive model, a possible impact to a computing resource of the node caused by a theoretical upgrade of the application from the first version to the second version; and generate a risk score indicating whether to upgrade the application executing on the node of the computing network system from the first version to the second version based on status data of the computing resource of the node and the possible impact to the computing resource of the node, wherein the status data comprises a current health of the computing resource indicating a degree in which the computing resource has degraded over time, and further based on a recertification burden associated with performing the upgrade, the recertification burden comprising at least one of a functional safety validation effort or a continuous integration process impact.

12. The computing network system of claim 11, the processing device of the control node is further to:

obtain a plurality of historical impact profiles associated with a plurality of nodes of the computing network system, each historical impact profile of the plurality of historical impact profiles indicates one or more actual impacts on one or more computing resources of a single node of the plurality of nodes caused by one or more version upgrades to applications executing on the single node.

13. The computing network system of claim 12, the processing device of the control node is further to:

generate a plurality of training datasets based on the plurality of historical impact profiles for a plurality of predictive models associated with a plurality of computing resources; and uniquely train, for each of the plurality of predictive models, a respective predictive model to predict possible impacts on a respective computing resource of the plurality of computing resources caused by theoretical version upgrades to the application using the respective computing resource.

14. The computing network system of claim 13, the processing device of the control node is further to:

determine, based on the request, a resource type of the computing resource of the node; and select, from the plurality of predictive models, the predictive model based on the resource type of the computing resource.

15. The computing network system of claim 11, wherein the status data comprises at least one of a current usage of the computing resource of the node or a current availability of the node.

16. The computing network system of claim 11, wherein to generate the risk score indicating whether to upgrade the application executing on the node of the computing network system from the first version to the second version is further based on a plurality of rules, wherein a first rule of the plurality of rules evaluates a first risk of changing the first version of the application executing on the node from a common vulnerability and exposure (CVE) perspective, wherein a second rule of the plurality of rules evaluates a second risk of changing the first version of the application executing on the node from an interoperability perspective.

17. The computing network system of claim 11, wherein to predict, based on the predictive model, the possible impact to the computing resource of the node, the processing device of the control node is further to:

evaluate, using an autoregressive function of the predictive model, one or more actual impacts on the computing resource of the node caused by one or more executions of previous versions of the application.

18. The computing network system of claim 11, wherein to predict, based on the predictive model, the possible impact to the computing resource of the node, the processing device of the control node is further to at least one of:

evaluate, using a moving average function of the predictive model, a variance in the possible impact caused by a non-deterministic environment of the node, or evaluate, using an exogenous terms function of the predictive model, differences between the first version and the second version of the application.

19. The computing network system of claim 11, wherein the processing device of the control node is further to:

provide the risk score to the node of the computing network system to cause the node to accept or reject the upgrade to the application based on the risk score.

20. A non-transitory computer-readable medium storing instructions that, when execute by a processing device of a control node of a computing network system, cause the processing device to:

receive a request for information indicating whether to upgrade an application executing on a node of the computing network system from a first version to a second version;

provide a historical impact profile of the node to a predictive model trained to predict possible impacts on computing resources caused by version upgrades to applications using the computing resources;

predict, by the processing device based on the predictive model, a possible impact to a computing resource of the node caused by a theoretical upgrade of the application from the first version to the second version; and generate a risk score indicating whether to upgrade the application executing on the node of the computing network system from the first version to the second version based on status data of the computing resource of the node and the possible impact to the computing resource of the node, wherein the status data comprises a current health of the computing resource indicating a degree in which the computing resource has degraded over time, and further based on a recertification burden associated with performing the upgrade, the recertification burden comprising at least one of a functional safety validation effort or a continuous integration process impact.

\* \* \* \* \*